United States Patent
Hetherington et al.

(10) Patent No.: US 8,065,951 B2
(45) Date of Patent: Nov. 29, 2011

(54) SERVO-CONTROLLED TIPPING PLATFORM AND MOTION CONTROL SYSTEM THEREFOR

(75) Inventors: Jack Hetherington, Haslett, MI (US); Michael Hetherington, Williamston, MI (US)

(73) Assignee: P.I. Engineering, Inc., Williamston, MI (US)

( * ) Notice: Subject to any disclaimer, the term of this patent is extended or adjusted under 35 U.S.C. 154(b) by 1360 days.

(21) Appl. No.: 11/355,032

(22) Filed: Feb. 15, 2006

(65) Prior Publication Data

US 2006/0222539 A1    Oct. 5, 2006

Related U.S. Application Data

(60) Provisional application No. 60/652,863, filed on Feb. 15, 2005.

(51) Int. Cl.
*F01B 3/04* (2006.01)
(52) U.S. Cl. .................... 92/39; 108/4; 434/58
(58) Field of Classification Search .......... 92/39; 108/4; 434/58
See application file for complete search history.

(56) References Cited

U.S. PATENT DOCUMENTS

| | | | | |
|---|---|---|---|---|
| 3,288,421 A | * | 11/1966 | Peterson | 108/4 |
| 4,800,723 A | * | 1/1989 | Clot et al. | 92/39 |
| 5,344,316 A | * | 9/1994 | Hordijk et al. | 434/58 |
| 5,697,285 A | * | 12/1997 | Nappi et al. | 92/34 |

* cited by examiner

*Primary Examiner* — Daniel Lopez
(74) *Attorney, Agent, or Firm* — Gifford, Krass, Sprinkle, Anderson & Citkowaski, P.C.

(57) ABSTRACT

A motion platform/simulator uses pumps coupled to servo-controlled electric motors to pump fluid directly into and out of rubber bellows-type actuators. Peristaltic or gear pumps may be used in conjunction with linear transducers/encoders. The fluid can be a gas such as air or one of many non-toxic fluids, even water, as the pump or actuators require no lubrication from the working fluid. In the preferred embodiment, a mechanical pivot such as a U-joint is situated between the platform and the ground surface, and each transducer is located immediately adjacent an actuator. A reservoir or reservoirs may be provided to supply and receive fluid to and from the actuator(s) through the pump(s) or, alternatively, the pump(s) may be coupled between two actuators, thereby eliminating the need for a fluid reservoir. A pump may be coupled between two stacked actuators or different actuators located at different points on the platform.

3 Claims, 3 Drawing Sheets

SERVO-CONTROLLED TIPPING PLATFORM AND MOTION CONTROL SYSTEM THEREFOR

REFERENCE TO RELATED APPLICATION

This application claims priority to U.S. Provisional Patent Application Ser. No. 60/652,863, filed Feb. 15, 2005, the entire content of which is incorporated herein by reference.

FIELD OF THE INVENTION

This invention relates generally to motion simulators and, in particular, to tipping platforms using peristaltic pumps to drive fluid-expandable actuators.

BACKGROUND OF THE INVENTION

Full-motion simulators for vehicle training and recreation are traditionally very costly. Most professional units use expensive hydraulic loop systems with several servo controlled hydraulic cylinders. These systems also generate considerable noise, require expensive servo control valves, and generally require a large amount of power. In addition, as with any traditional hydraulic system, existing simulators are prone to leaks around the cylinder and pump seals.

SUMMARY OF THE INVENTION

This invention eliminates many of the problems associated with existing motion simulators. Using pumps coupled to servo-controlled electric motors, fluid is pumped directly into and out of the actuators, preferably "air-spring" rubber bellows type actuators. Suitable pumps include peristaltic pumps and gear pumps, and suitable transducers include linear transducers/encoders.

Thus, a motion-control system for a platform disposed above a ground surface according to the invention includes an expandable bellows-type actuator disposed between the platform and the ground surface, a transducer for determining the position or orientation of the platform relative to the ground surface, and a pump operative to transfer fluid to and from the actuator in response to the position or orientation determined by the transducer. While air would work well, a non-compressible fluid is preferred to minimize the "squishy" feeling from compressible fluids such as air. The fluid can be one of many non-toxic fluids, even water, as the pump or actuators require no lubrication from the working fluid.

In the preferred embodiment, a mechanical pivot such as a U-joint is situated between the platform and the ground surface, and each transducer is located immediately adjacent an actuator. A reservoir or reservoirs may be provided to supply and receive fluid to and from the actuator(s) through the pump(s) or, alternatively, the pump(s) may be coupled between two actuators, thereby eliminating the need for a fluid reservoir. A pump may be coupled between two stacked actuators or different actuators located at different points on the platform.

In accordance with the invention, a motion-control system for a platform disposed above a ground surface, the platform having first and second ends and two opposing sides divided by a centerline, comprises a pivot having one end coupled to the ground surface and another end coupled to the platform on the centerline closer to the second end, a pair of expandable-contractible actuators, one between the ground surface and the side of the platform toward the first end, and another between the ground surface and the opposing side of the platform toward the first end, a pair of transducers, each associated with one of the actuators for determining the position or orientation of the platform relative to the ground surface, and a pair of pumps, each operative to transfer fluid to and from a respective one of the actuators in response to the position or orientation determined by the transducer.

DETAILED DESCRIPTION OF THE INVENTION

Figure 1:
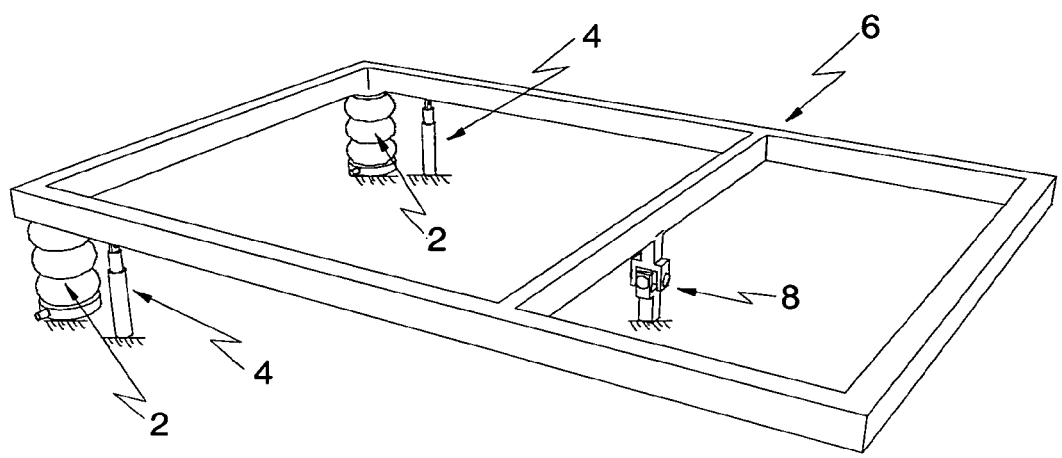
FIG. 1 is a perspective view of a motion platform constructed in accordance with this invention.

FIG. 1 is a simplified, perspective view of a tipping platform constructed in accordance with the invention. In the preferred embodiment, the platform 6 is almost balanced on a central pivot point 8. The pivot point can be located to optimize the average force and motion required for a particular application. Typically the pivot point would be placed to maintain some positive weight on the actuators to aid in the compression of the actuators.

This pivot point constrains rotation while allowing for changes in pitch and roll. The pivot can be made with a simple U-joint 8. This central pivot point will allow the use of only 2 actuators 2 to generate the important feeling of tipping in forward and sideways motion. Alternatively, the pivot point may be eliminated and replaced with additional actuators. Actuator position is measured by transducers 4, and this information is fed back to a control system to servo the desired position. Any suitable transducers may be used, including linear encoders.

If the pivot constrains rotation then the actuators are only required to control the linear extent of the driven axis. A U-joint type of pivot constrains rotation and allows the use of actuators such as rubber bellows that do not have lateral constraint, as a traditional hydraulic cylinder does. When the platform is not moved at great angles, the actuators can be directly connected to the platform frame without the use of special gimbals or trunions because small miss-alignments caused by the change in angle are tolerated by a rubber bellows.

According to this invention, different types of pumps may be used to effectuate fluid transfer, including peristaltic pumps and gear pumps. Peristaltic pumps work by using flexible tubing inside a raceway, which is alternately compressed by a set of rotating rollers. This flexing action insulates the materials being transferred from the moving parts of the pump, thus eliminating any moving seals or sliding metal parts in direct contact with the fluid. This is a positive displacement pump and can be driven in either direction equally. The pumps in this invention do not rotate at a constant speed or direction. Rather, rotation speed and direction are controlled by an electronic motor control system that receives commands from a computer to generate a desired motion effect.

Figure 2:
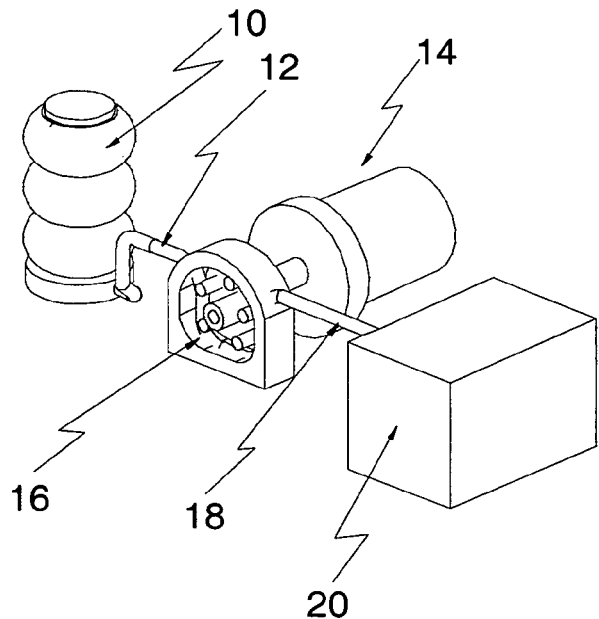
FIG. 2 is a detail drawing of a peristaltic pump driving a bellows-type actuator.

FIG. 2 is a drawing that depicts a peristaltic pump 14 interconnecting a bellows-type actuator to a reservoir 20 through respective tubes 12, 18. Tubes 12, 18 are preferably rigid except for the compressible length of hose in the pump roller mechanism 16. The reservoir 20 may be a standard tank or a flexible bladder, in which case it may be totally sealed.

Major companies like Goodyear manufacture bellows that may be deployed by this invention. A single air spring type rubber bellows can provide up to 34,000 pounds of linear force and variable amounts of stroke. Rubber bellows can be operated vertically, horizontally, or at an angle. They are capable of rapid actuation and can be applied to produce rotary motion. Rubber bellows cost about half as much as air cylinders and about one-fifth as much as hydraulic cylinders. They are easy to install, require little maintenance and often have a longer service life than air cylinders. And unlike air and hydraulic cylinders, no lubrication is needed since there are no sliding seals to wear out. Rubber bellows are responsive enough to handle high speed, positioning, clamping and stitching operation on heavy-duty equipment.

Continuing the reference to FIG. 2, each pump 16 and associated actuator are designed to work together, requiring a separate pump/motor system for each desired axis of movement. The integration of pump and actuator in a single, closed-loop system allows a servo controlled electric motor to directly drive the actuator. Feedback from the actuator position is directly used to control the pump/motor system. This eliminates the cost and reliability issues caused by separate servo control valves. It also reduces the noise and constant power use of a pump when the system requires little or no motion. When the actuator is stopped the pump is stopped.

Figure 3:
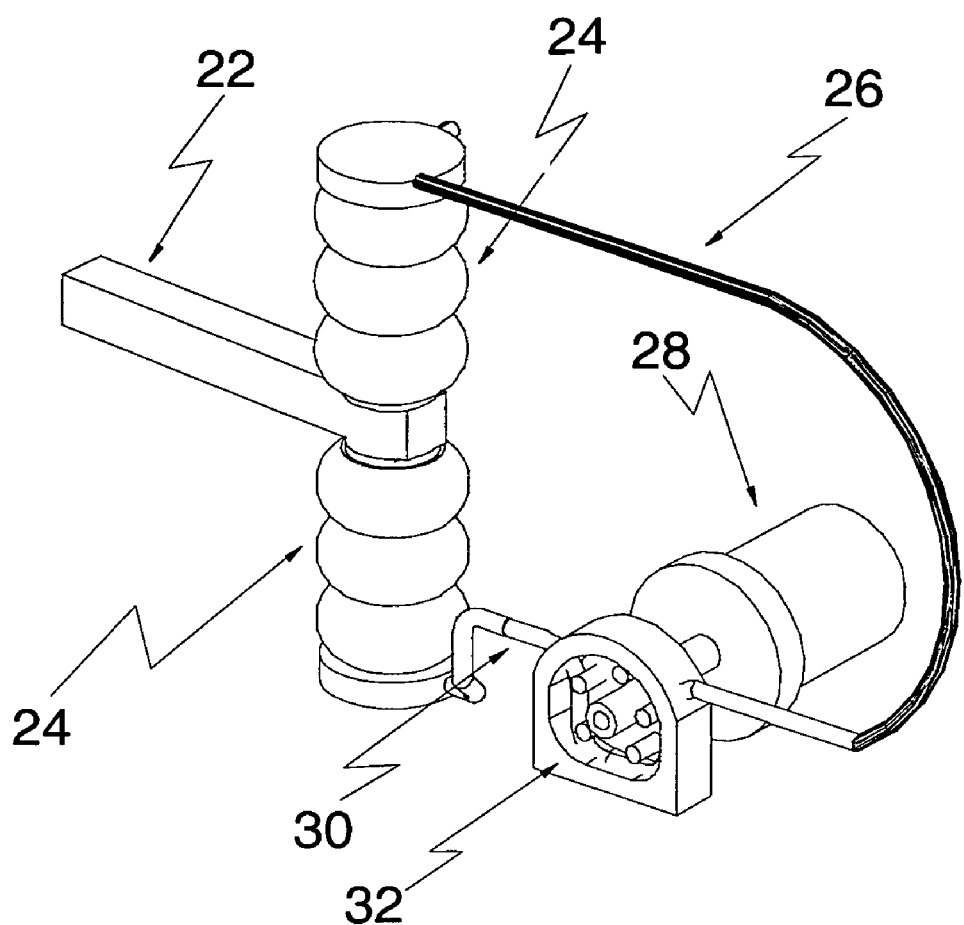
FIG. 3 shows how a single pump may be connected to two actuators, thereby eliminating the need for a separate reservoir.

The rubber bellows-type actuators are usually considered single acting cylinders but the pump system can feed or draw fluid from the actuators, thus moving it actively in both directions. This limits the negative suction pressure to less than 14 psi. To eliminate this constraint, matched pairs of actuators can be used on either side of the pump, as shown in FIG. 3. The fluid reservoir is not needed if the two actuators are matched. A single pump may be used between two different actuators if a degree of motion constraint is acceptable for a given application.

Figure 4:
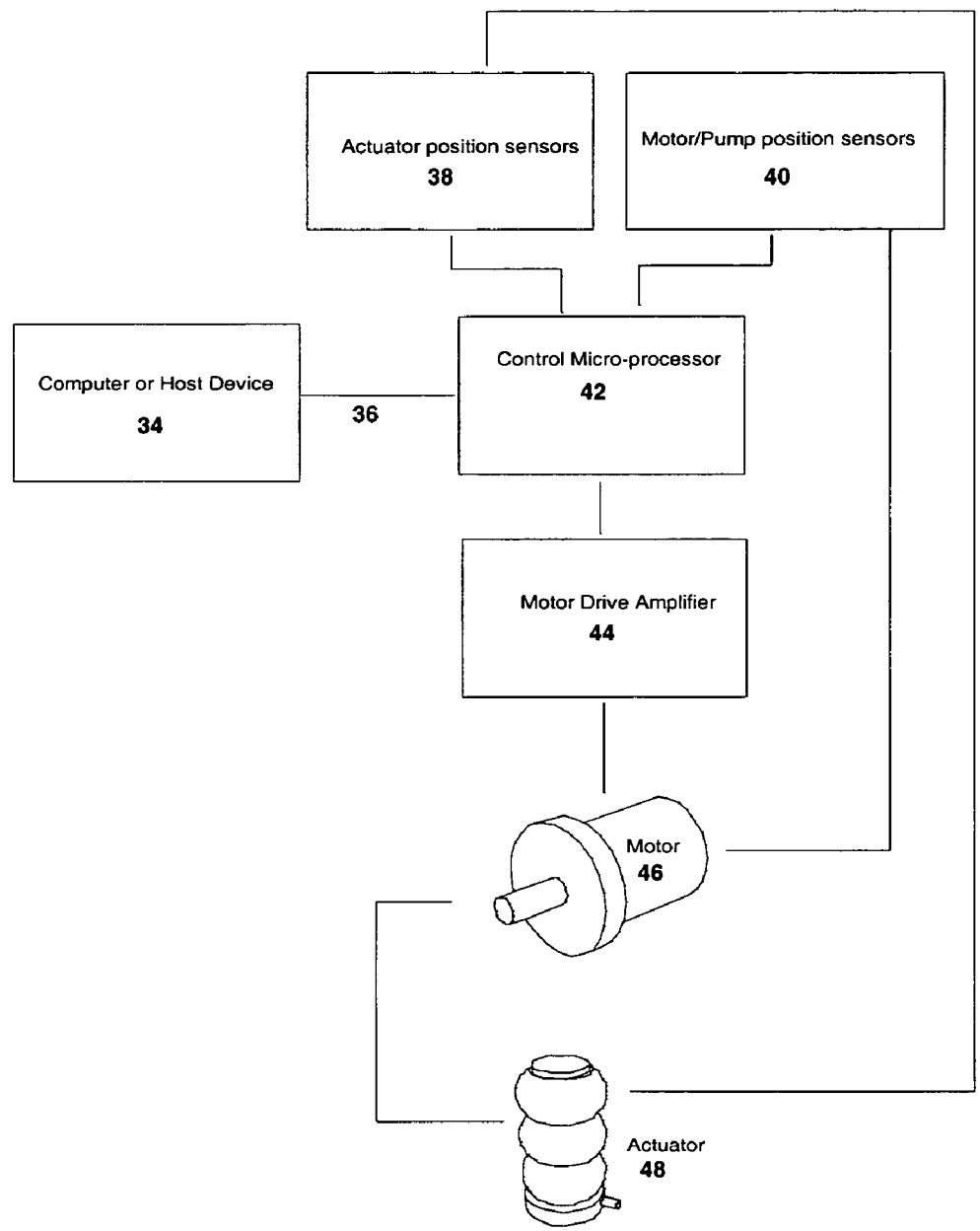
FIG. 4 shows control system logic.

The control system logic is basically the same as any normal servo feedback control system. Referring to FIG. 4, a control micro-processor 42 receives signals from an external computer or other position signal producing device from the input connection 36. This connection can be one of many standard digital formats, such as USB, Network, Serial, RS 485, RS 422, or PC computer parallel port. It also may be a direct analog signal such as a simple audio output with DC offset. In the digital form the signal formats transmitted could be a standard PC ".wav" format or MP3, or a machine control format such as G-code. For an analog signal any system capable of production low frequency audio signal with a DC off-set could produce the signal.

The control micro-processor 42 determines the necessary speed and direction to drive the motor 46 by comparing the actual position of the actuator 48 from its position sensor 38 to desired position sent from the host 34. The control micro-processor sends signals to the motor drive amplifier 44 to provide the necessary power to drive the motor 46. The motor/pump 46 drives fluid to the actuator 48, causing it to move. This feedback system will allow the control system to compensate for any internal leakage of the pump. Additionally, if the motor/pump has a position sensor it can be used to determine the actual relation between motor rotation and actuator position. Although not necessary for a basic servo system, information can be used to determine internal wear on the pump and other failure conditions.

Although no shown in the drawings, platforms according to the invention may be used in place of any existing motion systems, including sports simulators, virtual reality simulators, flight simulators, computer games, and so forth. The basic platform may be equipped with a chair or other feature allowing a user to sit, stand or lay during use.

We claim:

1. A motion-control system for a platform disposed above a ground surface, comprising:
    an expandable bellows-type actuator disposed between the platform and the ground surface;
    a transducer for determining the position or orientation of the platform relative to the ground surface; and
    a peristaltic pump operative to transfer fluid to and from the actuator in response to the position or orientation determined by the transducer.

2. A motion-control system for a platform disposed above a ground surface, comprising:
    an expandable bellows-type actuator disposed between the platform and the ground surface;
    a transducer for determining the position or orientation of the platform relative to the ground surface; and
    a gear pump operative to transfer fluid to and from the actuator in response to the position or orientation determined by the transducer.

3. A motion-control system for a platform disposed above a ground surface, comprising:
    an expandable bellows-type actuator disposed between the platform and the ground surface;
    a transducer for determining the position or orientation of the platform relative to the ground surface;
    a gear pump operative to transfer fluid to and from the actuator in response to the position or orientation determined by the transducer; and
    a reservoir to supply and receive fluid to and from the actuator through the pump.

* * * * *